(12) United States Patent
Takahashi et al.

(10) Patent No.: US 9,898,006 B2
(45) Date of Patent: Feb. 20, 2018

(54) DRIVE ASSIST DEVICE

(71) Applicant: HONDA MOTOR CO., LTD., Minato-ku, Tokyo (JP)

(72) Inventors: Naoki Takahashi, Wako (JP); Haruhiko Nishiguchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/511,066

(22) PCT Filed: Aug. 24, 2015

(86) PCT No.: PCT/JP2015/073659
§ 371 (c)(1),
(2) Date: Mar. 14, 2017

(87) PCT Pub. No.: WO2016/042978
PCT Pub. Date: Mar. 24, 2016

(65) Prior Publication Data
US 2017/0261987 A1    Sep. 14, 2017

(30) Foreign Application Priority Data

Sep. 16, 2014    (JP) ................................. 2014-187757

(51) Int. Cl.
*G01C 22/00* (2006.01)
*G05D 1/00* (2006.01)
(Continued)

(52) U.S. Cl.
CPC ........... *G05D 1/0088* (2013.01); *B60W 50/10* (2013.01); *G01C 21/3415* (2013.01)

(58) Field of Classification Search
CPC .... G05D 1/0088; B60W 50/10; B60W 30/16; B60W 30/09; B60W 50/14;
(Continued)

(56) References Cited

U.S. PATENT DOCUMENTS 6,591,172 B2 * 7/2003 Oda .................. G05D 1/027
701/23
8,983,679 B2    3/2015 Kitahama et al.
(Continued)

FOREIGN PATENT DOCUMENTS

CN    102334151 A    1/2012
JP    2003-141676 A   5/2003
(Continued)

OTHER PUBLICATIONS

International Search Report from PCT/JP2015/073659 with English translation thereof.
(Continued)

*Primary Examiner* — Shardul D Patel
(74) *Attorney, Agent, or Firm* — Carrier Blackman & Associates, P.C.; Joseph P. Carrier; William D. Blackman

(57) ABSTRACT

An automatic drive control unit implements automatic drive of a vehicle along a pre-set path without operation by a passenger while making decisions about the peripheral situation on the basis of vehicle peripheral environment information recognized by a peripheral environment information detection unit and a peripheral environment recognition unit. When the passenger's intention to make a right or left turn for changing to another path from the pre-set path is detected by a right or left turn intention input unit and a right or left turn intention detection unit, the automatic drive control unit continues the automatic drive while changing the path in a direction indicated by the right or left turn intention.

6 Claims, 5 Drawing Sheets

(51) Int. Cl.
  *G01C 21/34* (2006.01)
  *B60W 50/10* (2012.01)
(58) Field of Classification Search
  CPC .. G01C 21/3415; G01C 21/34; H04N 17/002; G06T 7/0018; B62D 15/028; B62D 15/021
  USPC .............................. 701/1, 23, 25, 58, 70, 93; 340/995.19–995.27; 341/51
  See application file for complete search history.

(56) References Cited

U.S. PATENT DOCUMENTS

| | | | |
|---|---|---|---|
| 9,417,080 B2 | 8/2016 | Kitahama et al. | |
| 2008/0162010 A1* | 7/2008 | Klotz | B60K 31/0008 701/93 |
| 2014/0149013 A1* | 5/2014 | Matsuno | G08G 1/166 701/70 |
| 2015/0073620 A1* | 3/2015 | Matsumura | B60W 30/143 701/1 |
| 2015/0177007 A1* | 6/2015 | Su | G01C 21/34 701/25 |
| 2015/0232026 A1* | 8/2015 | Lueke | B60Q 9/00 701/1 |
| 2016/0082978 A1* | 3/2016 | Ozaki | G01C 21/34 701/58 |

FOREIGN PATENT DOCUMENTS

| | | |
|---|---|---|
| JP | 2003-214887 A | 7/2003 |
| JP | 2004-331072 A | 11/2004 |
| JP | 2006-112932 A | 4/2006 |
| JP | 2012-214123 A | 11/2012 |
| JP | 2012-214124 A | 11/2012 |
| JP | 2012-214125 A | 11/2012 |
| JP | 2012-216069 A | 11/2012 |
| JP | 2015-148533 A | 8/2015 |

OTHER PUBLICATIONS

Office Action including a Search Report dated Dec. 4, 2017, issued over the corresponding Chinese Patent Application No. 201580049162.7, with an English machine translation of the Office Action and partial English translation of the Search Report.

* cited by examiner

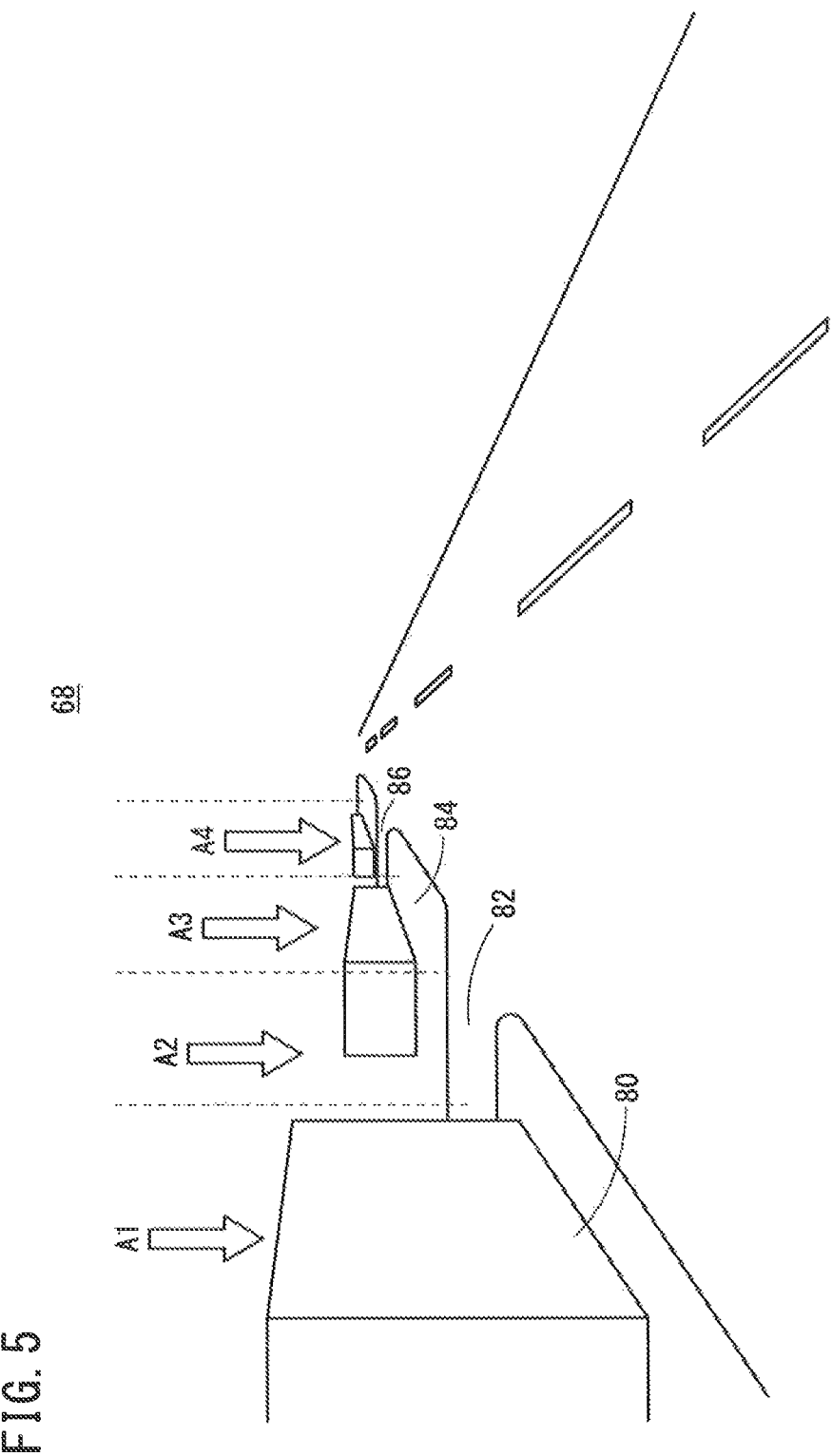

DRIVE ASSIST DEVICE

TECHNICAL FIELD

The present invention relates to a drive assist device (driving assistance device) that performs automated driving of a vehicle along a previously set route without depending on operations of a vehicle occupant.

BACKGROUND ART

In recent years, automatically driven vehicles equipped with driving assistance devices have been developed. Such automatically driven vehicles, on the basis of images and position information obtained from various sensors that are mounted on the vehicle, carry out automated driving to a destination along a previously set route while avoiding obstacles, without depending on operations of the vehicle occupant.

A driving assistance device for an electric vehicle is disclosed in Japanese Laid-Open Patent Publication No. 2006-112932. A configuration is provided such that, during automated driving of the electric vehicle to a destination, the driving assistance device selects a charging location in accordance with the need for charging, and sets a route to the charging location (refer to paragraphs [0031], [0047], [0048] of Japanese Laid-Open Patent Publication No. 2006-112932). In the event there is a stopover, setting of the stopover point is carried out in advance by the vehicle occupant (see paragraph [0063] and FIG. 5 of Japanese Laid-Open Patent Publication No. 2006-112932).

SUMMARY OF INVENTION

During automated driving, cases may occur in which the occupant of the vehicle desires to suddenly stop into a store that has not been set as a stopover point, or the occupant may desire to drive to the destination while bypassing the set route. In such cases in which it is necessary to change to another route, in the conventional driving assistance device including the device disclosed in Japanese Laid-Open Patent Publication No. 2006-112932, it is necessary for the vehicle occupant to operate an input device of the driving assistance device and reset the route, or automated driving must be released and switching to manual driving must be carried out.

However, if the stopover location that the vehicle occupant desires to visit is near to the current position of the vehicle, there is a possibility that operations such as resetting the route or the like and switching over to manual driving cannot be performed in time. This also is accompanied by a danger in that the vehicle occupant may become flustered in attempting to carry out such operations in a hurry. Furthermore, in the case that automated driving is released, it becomes necessary for manual driving to be performed, and the burden on the vehicle occupant or driver increases.

The present invention has been devised taking into consideration the aforementioned problems, and has the object of providing a driving assistance device which, in the case it becomes necessary to change to another route or the like, the route can be changed merely by the vehicle occupant inputting an intention to turn right or left, and automated driving of the vehicle can be continued.

The present invention is characterized by a driving assistance device comprising a surrounding environmental information acquisition unit that recognizes surrounding environmental information of a user's own vehicle, and an automated driving control unit that controls automated driving in which the user's own vehicle is driven automatically along a previously set route without depending on operations of a vehicle occupant, on the basis of the surrounding environmental information of the user's own vehicle, which was recognized by the surrounding environmental information acquisition unit. The driving assistance device further comprises a right or left turning intention detecting unit that detects a right or left turning intention of the occupant who changes to another route from the previously set route. In the case that the right or left turning intention of the occupant is detected by the right or left turning intention detecting unit, the automated driving control unit changes the route to a right turn direction or a left turn direction as indicated by the right or left turning intention, and then continues with automated driving.

According to the present invention, in the case that during automated driving it is necessary to change to a route other than the previously set route such as when the occupant of the vehicle desires to suddenly stop into a store or the like, the route can be changed merely by the right or left turning intention, and automated driving can be continued. Therefore, the occupant can intuitively make a stopover at a place that the occupant wishes to visit. Further, when the route is changed, since there is no need to switch to manual driving when the occupant is hurried or flustered, safety can be maintained.

In the present invention, the right or left turning intention may be a turn signal operation or a steering operation. The turn signal operation or the steering operation is an operation performed by the vehicle occupant when making a right turn or a left turn by way of manual driving. Therefore, during automated driving, the vehicle occupant can easily indicate the right or left turning intention with the same feeling as manual driving.

In the present invention, the automated driving control unit changes the route to a route candidate nearest to the position of the user's own vehicle, at a point in time that the right or left turning intention is detected by the right or left turning intention detecting unit. Assuming that this feature is carried out, in the case that the right or left turning intention is detected, the route can be changed immediately.

In the present invention, there may further be provided a route change information storage unit in which a history of route change information is stored, and the automated driving control unit may change the route to a route candidate having high priority on the basis of the route change information stored in the route change information storage unit. In this manner, if a change in the route is made for which there is a high possibility of being selected by the vehicle occupant from the route change information history, then in the case that the right or left turning intention is detected, the route can be changed immediately.

In the present invention, there may further be provided a notification unit that provides notification of a route candidate, wherein, at a point in time that the right or left turning intention is detected by the right or left turning intention detecting unit, if there are a plurality of route candidates, the notification unit may provide notification of the plurality of route candidates, and the automated driving control unit may change the route to a route candidate selected by the vehicle occupant from among the plurality of route candidates. If carried out in this manner, in the event there are a plurality of route candidates, it is possible to specify a route to be changed to in accordance with the will of the vehicle occupant.

In the present invention, the notification unit may be a display unit, and such a display unit may display a route candidate that is nearest to the position of the user's own vehicle, in a larger size than other route candidates. On the premise that there is a high possibility that the nearest route candidate will be selected, displaying the route candidates in this manner makes it easier for the occupant to select the route that should be changed to.

In the present invention, the notification unit may be a display unit, and there may further be provided a route change information storage unit in which a history of the route change information is stored. In this case, the display unit may display a route candidate having high priority in a larger size than other route candidates, on the basis of the route change information stored in the route change information storage unit. Assuming there is displayed in a preferential manner a route from among past route change information for which the possibility of being selected by the vehicle occupant is high, the route to be changed to can easily be selected by the occupant.

In the present invention, the surrounding environmental information acquisition unit may recognize a road shoulder structure, and the automated driving control unit may determine whether or not a right or left turn is possible on the basis of the road shoulder structure recognized by the surrounding environmental information acquisition unit, and may change the route only in the event that the right or left turn is possible. In this manner, the route can be changed if there is not a road shoulder structure such as a curb. Further, if there is such a road shoulder structure, and assuming that the route is not changed, it is possible to prevent the occurrence of an impact due to the user's own vehicle riding over the road shoulder structure or the like.

In the present invention, the surrounding environmental information acquisition unit may recognize a vehicle lane, and the automated driving control unit may determine whether or not it is necessary when changing the route to straddle the vehicle lane that was recognized by the surrounding environmental information acquisition unit, and may change the route only if it is unnecessary to straddle the vehicle lane. In this manner, if a change in the route is carried out without making a lane change, then since it is unnecessary to perform controls involving a high processing load such as in the case of making a lane change or the like, the burden on the computational processing device can be reduced.

According to the present invention, in the case it becomes necessary to change the previously set route to another route during automated driving, such as when the vehicle occupant suddenly desires to make a stopover at a store or the like, the route can be changed merely on the basis of the right or left turning intention of the occupant, and automated driving can be continued. Therefore, the occupant can intuitively make a stopover at a place that the occupant wishes to visit. Further, when a change in the route is made, since there is no need to switch to manual driving while the occupant is hurried or flustered, safety can be maintained.

BRIEF DESCRIPTION OF DRAWINGS

FIG. 5 is a schematic diagram showing a screen of a display device.

DESCRIPTION OF EMBODIMENTS

A preferred embodiment of the driving assistance device according to the present invention will be described in detail below with reference to the accompanying drawings. In the present embodiment, a four-wheeled vehicle is assumed as the vehicle.

[Configuration of Driving Assistance Device 10]

Figure 1:
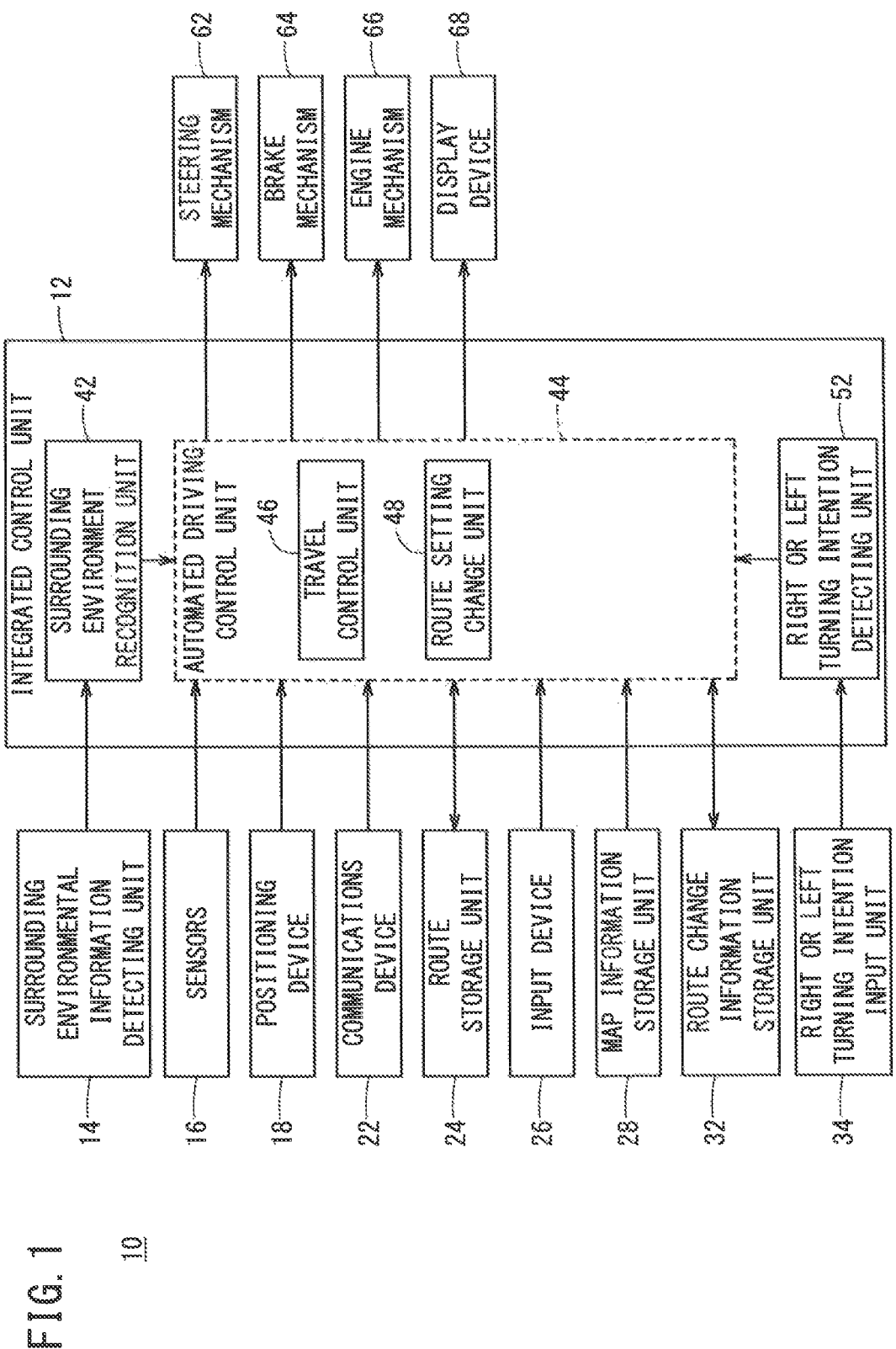
FIG. 1 is a block configuration diagram of a driving assistance device according to an embodiment of the present invention.

With reference to the block configuration diagram shown in FIG. 1, a description will now be given of a driving assistance device 10 according to the present invention. The driving assistance device 10 includes an integrated control unit 12 including an ECU (electronic control unit). The ECU is an arithmetic processing device including a microcomputer, and further includes a CPU (Central Processing Unit), a ROM (including an EEPROM) and a RAM (Random Access Memory) as memories thereof, and input/output devices such as an A/D converter, a D/A converter, etc. The CPU functions as various function realizing units (function realizing means) such as, for example, a control unit, a computational unit, and a processing unit and the like, by reading out and executing programs stored in the ROM. It is noted that such functions can also be realized by hardware components. Further, the ECU can be integrated into a single device, or can be divided across multiple devices.

In the present embodiment, the integrated control unit 12 acquires various types of information, and controls automated driving.

A surrounding environmental information detecting unit 14 is a device that detects environmental information around the periphery of the user's own vehicle. More specifically, the surrounding environmental information detecting unit 14 is equipped with devices for actively detecting surrounding environmental information of the user's own vehicle, such as a millimeter wave radar, a microwave radar, a laser radar, an infrared sensor, an ultrasonic sensor, and an optical camera, etc. Such devices preferably are provided in plurality, so that surrounding environmental information of the vehicle can be detected without omission. Further, a device may be provided for detecting as surrounding environmental information of the user's own vehicle information that is transmitted from roadside devices such as beacons or the like. Furthermore, a device may be provided for detecting as surrounding environmental information of the user's own vehicle information that is transmitted from cameras or radar devices, etc., which are disposed on the road. Cameras and radar devices are attached at a plurality of locations of the user's own vehicle, and the surrounding environmental information of the user's own vehicle, such as other vehicles, traffic signals, travel lanes, obstacles in the direction of travel, pedestrians, road shoulder structures, features involved at the time of turning right or left, and road signs, etc., are detected thereby.

Sensors 16 are equipped with various sensors apart from the sensors included in the surrounding environmental information detecting unit 14. For example, such sensors comprise a wheel speed sensor that detects a wheel speed of each of the wheels, a G sensor for detecting acceleration in three orthogonal directions (a vehicle length direction, a vehicle width direction, and a vehicle height direction) of the user's own vehicle, and the like.

The positioning device 18 is equipped with a device for measuring the position of the user's own vehicle, which is configured to be capable of measuring the position of the user's own vehicle by way of radio navigation using a GPS receiver, and autonomous navigation using a gyro sensor and a G sensor.

A communications device 22 is equipped with a communication medium that performs wireless communications with the exterior, and may be configured to acquire information from a communications network, for example, a VICS (registered trademark) communications network, or may acquire information from a general communications line such as a mobile phone or the like. In addition, the communications device 22 may be constituted to acquire information from roadside devices.

A route storage unit 24 is configured to store one or more set routes. As such set routes, there may be included a route from a departure point to a destination point, a route that circulates around a certain road, and a route for straight traveling only, etc.

An input device 26 is a machine-human interface, which is operated by a vehicle occupant when setting or changing the route, and transmits input information to the integrated control unit 12 corresponding to such operations. For example, the input device 26 can make use of a touch panel, a remote control device, and a switch or the like. Further, a voice input device may be used, or positions and motions of a fingertip of the vehicle occupant within a predetermined region may be detected in order to generate position and motion information of the fingertip.

A map information storage unit 28 is configured to store map information. Within such map information, there are included road information (expressways, toll roads, national highways, prefectural roads), traffic regulation information, VICS (registered trademark) target road information, address information (addresses, postal codes), facility information (including shop information), and phone number information, etc. The map information is capable of being updated by way of a recording medium or by way of communications.

A route change information storage unit 32 is configured so as to store a history (history of the route change information) of routes that were changed during automated driving of the user's own vehicle. Among such route change information, there may be included a date and time of the route change, a location of the route change, a type of changed route destination (shops, facilities, road intersections, etc.), and furthermore, the type of store if the changed destination is a store.

A right or left turning intention input unit 34 is equipped with a device by which the right or left turning intention for bypassing the route is input by the vehicle occupant, and which for example, is an operating device such as a turn signal (direction indicator) or the steering wheel, and is also equipped with a sensor for detecting when such devices have been operated. The right or left turning intention input unit 34 is configured to transmit right or left turning intention information to the integrated control unit 12 when the occupant performs a right or left turning operation using the operating device during automated driving.

The integrated control unit 12 is equipped with a surrounding environment recognition unit 42, an automated driving control unit 44, and a right or left turning intention detecting unit 52. Furthermore, the automated driving control unit 44 is equipped with a travel control unit 46 and a route setting change unit 48.

The surrounding environment recognition unit 42 is configured to recognize the state of the surrounding environment of the user's own vehicle, using surrounding environmental information of the user's own vehicle detected by the surrounding environmental information detecting unit 14. The recognition results thereof are transmitted to the travel control unit 46.

The travel control unit 46 acquires wheel speed information and the like from the sensors 16, acquires position information of the user's own vehicle from the positioning device 18, acquires road traffic information and the like from the communications device 22, and acquires route information from the route storage unit 24. Further, the travel control unit 46 acquires the recognition results of the surrounding environment of the user's own vehicle from the surrounding environment recognition unit 42. The travel control unit 46 controls a steering angle, a braking force, and a degree of throttle opening of the user's own vehicle via a steering mechanism 62, a brake mechanism 64, and an engine mechanism 66. The travel control unit 46 is configured to cause the user's own vehicle to travel along the previously set route or the changed route, while determining the surrounding situation on the basis of recognition results of the surrounding environment of the user's own vehicle.

A route setting change unit 48 is configured to acquire the map information from the map information storage unit 28, and to set a route responsive to operations of the input device 26 and store the route in the route storage unit 24. Further, the route setting change unit 48 is configured to perform a process of changing the route that is stored in the route storage unit 24, after acquisition of the right or left turning intention information from the right or left turning intention detecting unit 52. Furthermore, the route setting change unit 48 is configured to store the route change history in the route change information storage unit 32.

By acquiring the right or left turning intention information from the right or left turning intention input unit 34, the right or left turning intention detecting unit 52 detects a right turning intention or a left turning intention.

The steering mechanism 62 is configured to control a steering angle of the vehicle wheels by obtaining an operation instruction from the travel control unit 46. The brake mechanism 64 is configured to control a braking force by obtaining an operation instruction from the travel control unit 46. The engine mechanism 66 is configured to control a degree of opening of a throttle valve by obtaining an operation instruction from the travel control unit 46.

A display device 68 is a device for acquiring route candidates to be changed to from the map information storage unit 28, as well as for displaying the route candidates on a screen when a right or left turning intention is detected from the right or left turning intention detection unit 52, and is equipped with a heads-up display (HUD) and/or a car navigation display screen, etc. Maps, routes, and vehicle positions are displayed on the car navigation display screen. Route candidates can also be notified to the vehicle occupant by a device such as a speaker or the like.

[Operative Example 1 of Driving Assistance Device 10]

Next, a first operative example (Operative Example 1) of the driving assistance device 10 will be described with reference to the flowchart shown in FIG. 2.

In step S1, during automated driving, the integrated control unit 12 acquires information respectively from the surrounding environmental information detecting unit 14, the sensors 16, the positioning device 18, and the communications device 22. During execution of the respective processes of the flowchart shown in FIG. 2, reading in of respective items of information is carried out continuously at each of extremely short predetermined time intervals, for example, on the order of ms (milliseconds).

In step S2, it is determined whether or not there is a steering operation or a winker operation. If there is not a winker operation or a steering operation of the right or left turning intention input unit 34 (step S2: NO), then a route change is not carried out. On the other hand, if there is a winker operation or a steering operation of the right or left turning intention input unit 34 (step S2: YES), then the routine transitions to step S3. At this time, the right or left turning intention detecting unit 52 transmits right turning intention information or left turning intention information to the automated driving control unit 44.

In step S3, the route setting change unit 48 selects as a route to be changed to a route candidate that is nearest to the position of the user's own vehicle. At this time, the route setting change unit 48 extracts the route candidate that is nearest to the position of the user's own vehicle, on the basis of the map information of the map information storage unit 28, and the position information of the user's own vehicle that was acquired from the positioning device 18.

In step S4, a change of the route is carried out. Based on the routes that are stored in the route storage unit 24, the route setting change unit 48 adds the route selected in step S3, and changes (reroutes) the route to a different route. Furthermore, the route setting change unit 48 causes the route change information to be stored in the route change information storage unit 32.

In step S5, the travel control unit 46 controls the steering mechanism 62, the brake mechanism 64, and the engine mechanism 66, so as to execute a right or left turn according to the route, i.e., the rerouted route, which is stored in the route storage unit 24.

In the case that a road intersection was selected in step S3, then in step S5, the travel control unit 46 confirms that the traffic signal is displaying a green signal, and then executes the right or left turn. Further, in the case of a right turn, in step S5, the travel control unit 46 confirms that an oncoming vehicle is not approaching, and then executes the right turn.

In step S6, after making a right or left turn, automated driving is continued along the rerouted route.

[Other Embodiment of Operative Example 1]

Figure 2:
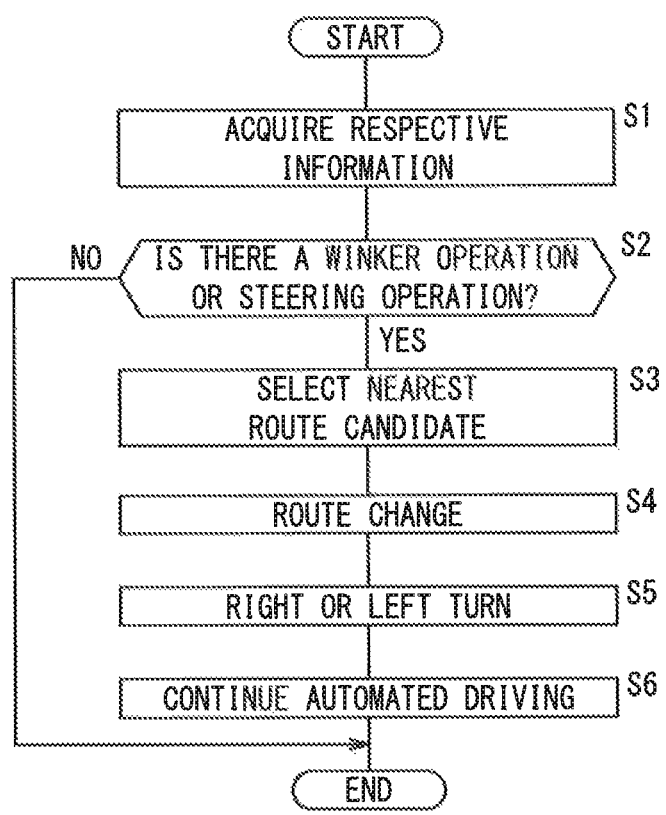
FIG. 2 is a flowchart for describing an Operative Example 1 of the driving assistance device.

In step S3 shown in FIG. 2, a route may also be determined on the basis of the route change information stored in the route change information storage unit 32. For example, if it is perceived within the accumulated route change information that there is a tendency to change the route to a particular type of store, and a store of the same type exists in close proximity to the location of the user's own vehicle, the store is selected as a route that should be changed to.

[Operative Example 2 of Driving Assistance Device 10]

Figure 3:
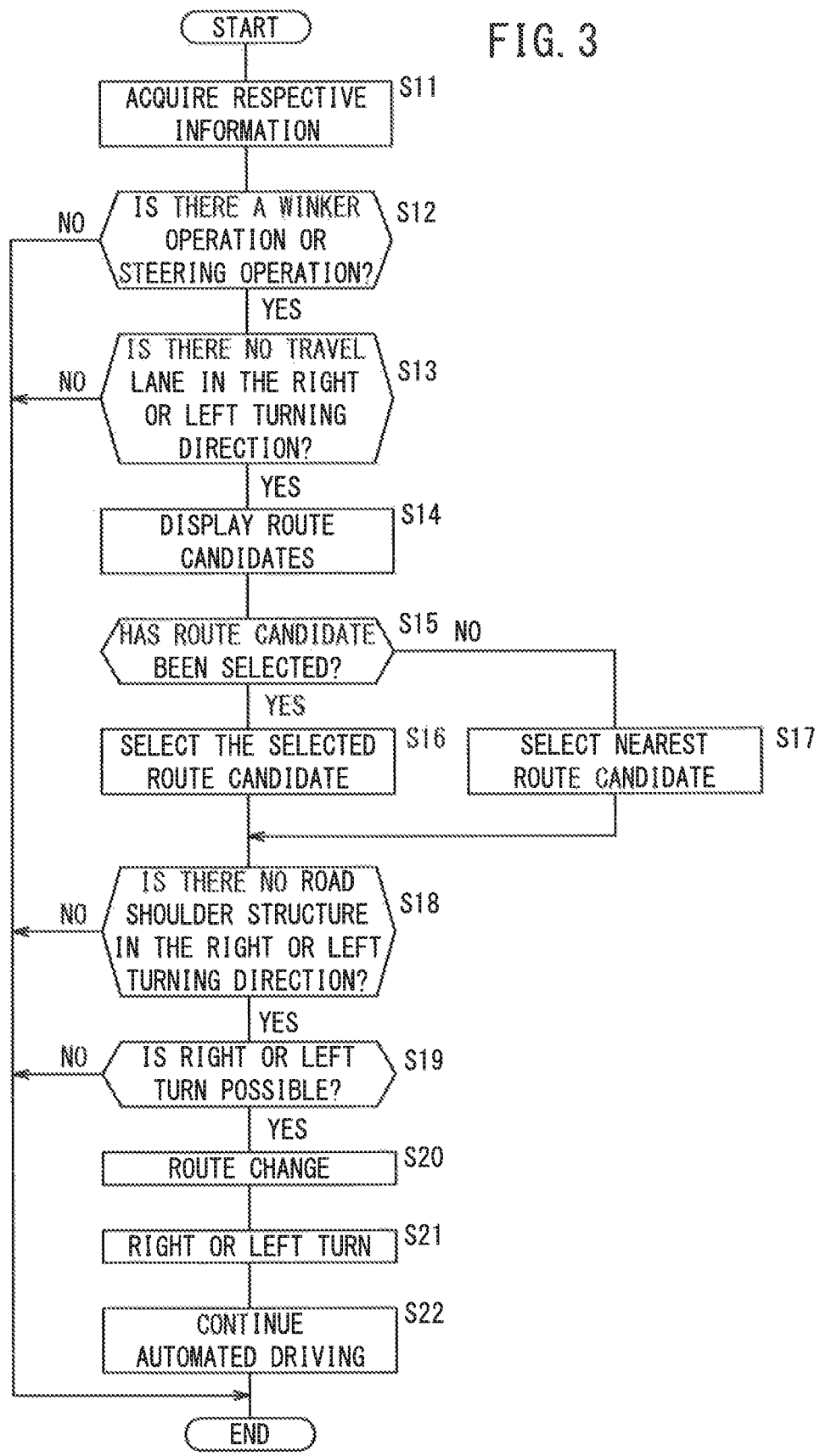
FIG. 3 is a flowchart for describing an Operative Example 2 of the driving assistance device.

Next, a second operative example (Operative Example 2) of the driving assistance device 10 will be described with reference to the flowchart shown in FIG. 3. The processes of step S11, step S12, step S17, and steps S20 to S22 of FIG. 3 are substantially the same as the processes of steps S1 to S6 of FIG. 2.

In step S11, in the same manner as step S1 of FIG. 2, during automated driving, the integrated control unit 12 acquires information respectively from the surrounding environmental information detecting unit 14, the sensors 16, the positioning device 18, and the communications device 22.

In step S12, in the same manner as step S2 of FIG. 2, it is determined whether or not there is a steering operation or a winker operation. If there is not a winker operation or a steering operation of the right or left turning intention input unit 34 (step S12: NO), then a route change is not carried out. On the other hand, if there is a winker operation or a steering operation of the right or left turning intention input unit 34 (step S12: YES), then the routine transitions to step S13. At this time, the right or left turning intention detecting unit 52 transmits right turning intention information or left turning intention information to the automated driving control unit 44.

In step S13, it is determined whether or not there is another vehicle lane in the right or left turn direction in which the turning intention was detected. More specifically, the travel control unit 46 acquires the recognition result of the surrounding environmental information from the surrounding environment recognition unit 42, and determines whether or not there is another vehicle lane in the right turn direction or the left turn direction of the travel lane in which the user's own vehicle travels. If such a travel lane exists (step S13: NO), in order to prevent the occurrence of complicated processing accompanying a lane change, a change in the route is not carried out. On the other hand, if such a travel lane does not exist (step S13: YES), the routine transitions to step S14.

Figure 4:
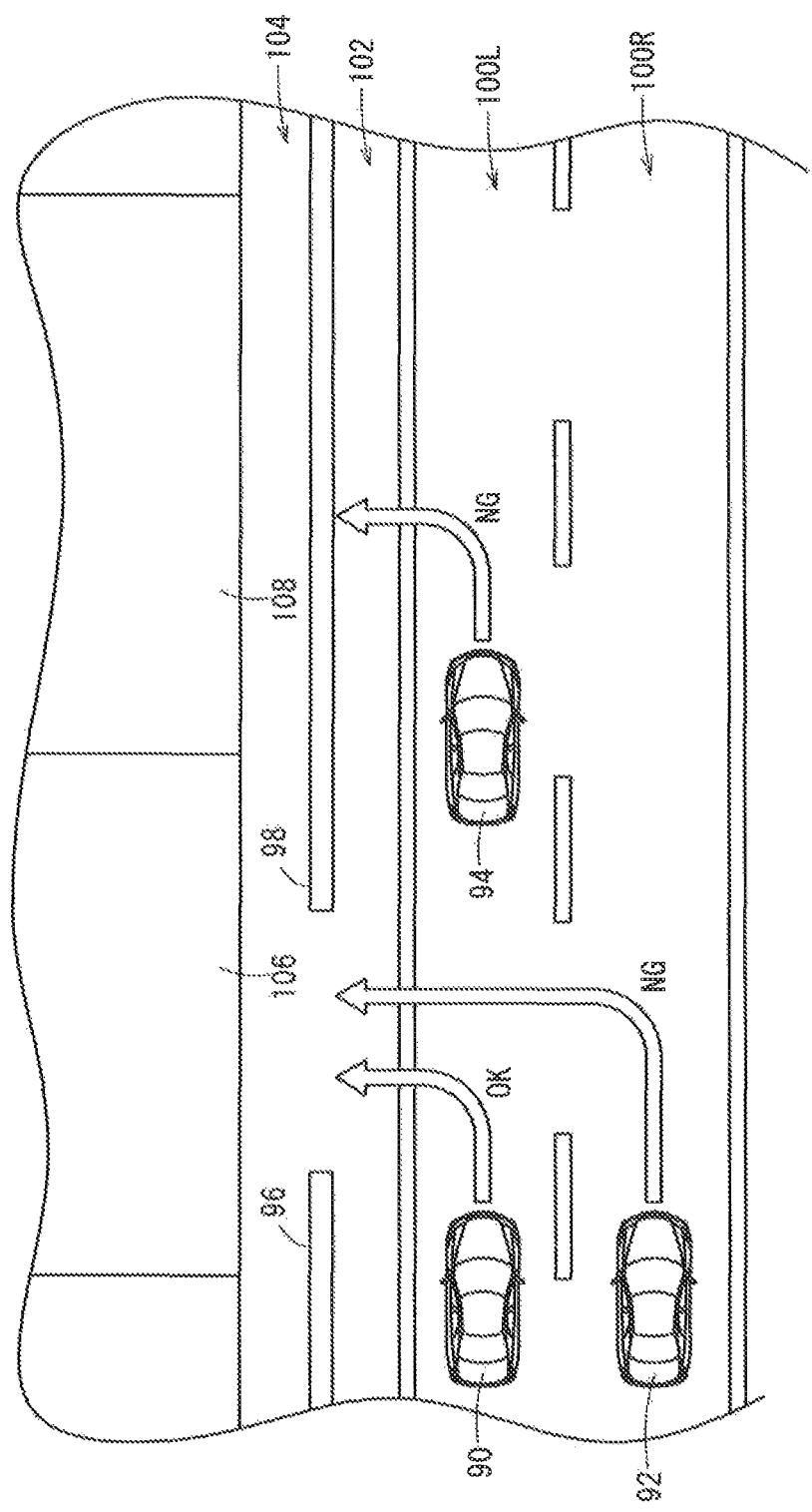
FIG. 4 is a diagram for describing a situation in which a left turn is made.

For example, as shown in FIG. 4, in the event there are one or more vehicle lanes 100L to the left of the vehicle lane 100R in which the user's own vehicle 92 is traveling, in order to change the route to the store 106, it is necessary to straddle or drive across the vehicle lane 100L. In such a case, a change in the route to the store 106 is not carried out. On the other hand, if the lane in which the user's own vehicle 90 is traveling is the leftmost vehicle lane 100L, the routine transitions to step S14.

In step S14, route candidates are displayed on the display device 68. The route setting change unit 48 extracts the route candidates that are nearest to the position of the user's own vehicle, on the basis of the map information of the map information storage unit 28, and the position information of the user's own vehicle that was acquired from the positioning device 18. As shown in FIG. 5, on the display device 68, arrows A1 to A4 are displayed above shops 80, 84 and intersecting roads 82, 86, which indicate respective route candidates.

In step S15, it is determined whether a route candidate has been selected by the vehicle occupant. If the vehicle occupant has selected any one from among the shops 80, 84 and the intersecting roads 82, 86 via the input device 26, the routine proceeds to step S16. In step S16, the route setting change unit 48 selects as a route to be changed to the route candidate that was selected by the vehicle occupant. On the other hand, if the vehicle occupant has not selected any one from among the shops 80, 84 and the intersecting roads 82, 86 even if a predetermined time period has elapsed, the routine proceeds to step S17. In step S17, the route setting change unit 48 selects as a route to be changed to a route candidate that is nearest to the position of the user's own vehicle.

In step S18, it is determined whether or not there is a road shoulder structure in the right or left turn direction to the selected route. The travel control unit 46 acquires the recognition result of the surrounding environmental information from the surrounding environment recognition unit 42, and determines whether or not there is a road shoulder structure in the right turn direction or the left turn direction to the selected route. If such a road shoulder structure exists (step S18: NO), the route change is not carried out. On the other hand, if such a road shoulder structure does not exist (step S18: YES), the routine transitions to step S19.

For example, as shown in FIG. 4, if there is a road shoulder structure 98 in the direction in which the user's own vehicle 94 makes a left turn, then a route change to the store 108 is not carried out. On the other hand, if there are no road shoulder structures 96, 98 in the direction in which the user's own vehicle 90 makes a left turn, the routine transitions to step S19.

In step S19, it is determined whether or not it is possible to make a right or left turn. The travel control unit 46 acquires the recognition result of the surrounding environmental information from the surrounding environment recognition unit 42, and determines whether or not there is a possibility of collision with something or someone who may be present on a rear side of the user's own vehicle. For example, as shown in FIG. 4, it is determined whether or not there is a possibility for the user's own vehicle 90 to collide with something or someone in the vehicle lane 100L, a bicycle lane 102, and a sidewalk 104. Further, the travel control unit 46 determines whether or not it is possible for the vehicle to be turned right or left without difficulty based on a distance to the selected route and the vehicle speed of the user's own vehicle. If there is a possibility for such collision or if a right or left turn cannot be made without difficulty (step S19: NO), the route change is not carried out. If there is no possibility for such collision and if the right or left turn can be made without difficulty (step S19: YES), the routine transitions to step S20.

In step S20, a change in the route is carried out. Based on the routes that are stored in the route storage unit 24, the route setting change unit 48 adds the route selected in step S16 or step S17, and changes (reroutes) the route to a different route. Furthermore, the route setting change unit 48 stores the route change information in the route change information storage unit 32.

In step S21, the travel control unit 46 controls the steering mechanism 62, the brake mechanism 64, and the engine mechanism 66, so as to execute a right or left turn according to the route, i.e., the rerouted route, which is stored in the route storage unit 24.

In the case that a road intersection was selected in step S16 or step S17, then in step S21, the travel control unit 46 confirms that the traffic signal is displaying a green signal, and then executes the right or left turn. Further, in the case of a right turn, in step S21, the travel control unit 46 confirms that an oncoming vehicle is not approaching, and then executes the right turn.

In step S22, after making a right or left turn, automated driving is continued along the rerouted route.

[Other Embodiments of Operative Example 2]

In step S14 shown in FIG. 3, the arrow A1 of the nearest route candidate may be displayed in a larger size than the arrows A2 to A4 of the other route candidates. Further, the shop 80, which is the nearest route candidate, may be displayed in a larger size than the other intersecting roads 82, 86 and the shop 84.

Further, in step S14 shown in FIG. 3, a route may also be determined in a prioritized order of the route candidates, on the basis of the route change information stored in the route change information storage unit 32. For example, if it is perceived within the accumulated route change information that there is a tendency to change the route to a particular type of store, and a store of the same type exists among the extracted priority candidates, the store is displayed in a larger size than the other route candidates on the display device 68.

Further, irrespective of whether there is a right or left turning intention, route candidates may be displayed at all times on the display device 68. In this case, the route candidates are changed according to the manner in which the user's own vehicle travels.

Further, in step S13, it is possible for a lane change to be made, and then to make a right or left turn. Further, in step S19, the user's own vehicle may execute a right or left turn after avoiding motorcycles, people, etc., for which there is a possibility for the vehicle to collide with.

[Summary of Embodiments]

As has been described above, the driving assistance device 10 according to the present embodiment includes the surrounding environmental information acquisition unit (surrounding environmental information detecting unit 14, surrounding environment recognition unit 42) that recognizes the surrounding environmental information of the user's own vehicle, and the automated driving control unit 44 that carries out automated driving of the user's own vehicle along a previously set route which is set without depending on operations of the vehicle occupant, on the basis of the surrounding environmental information of the user's own vehicle, which was recognized by the surrounding environmental information acquisition unit. The driving assistance device 10 is further equipped with the right or left turning intention detecting unit (right or left turning intention input unit 34, right or left turning intention detecting unit 52) that detects the right or left turning intention of the vehicle occupant who changes to another route from the previously set route. In the case that the right or left turning intention of the occupant is detected by the right or left turning intention detecting unit, the automated driving control unit 44 changes the route to a right turn direction or a left turn direction as indicated by the right or left turning intention, and automated driving is continued.

According to the present embodiment, in the case it becomes necessary to bypass the previously set route during automated driving, such as when the vehicle occupant suddenly desires to make a stopover at a store or the like, the route can be changed merely on the basis of the right or left turning intention of the occupant, and automated driving can be continued. Therefore, the occupant can intuitively make a stopover at a place that the occupant wishes to visit. Further, when the route is changed, since there is no need for the occupant to switch to manual driving hurriedly or flusteredly, safety can be maintained.

In the present embodiment (Operative Examples 1 and 2), the right or left turning intention is a turn signal operation or a steering operation. The turn signal operation or the steering operation is an operation performed by the vehicle occupant when making a right turn or a left turn by way of manual driving. Therefore, during automated driving, the vehicle occupant can easily indicate the right or left turning intention with the same feeling as manual driving.

In the present embodiment (Operative Example 1), the automated driving control unit 44 changes the route to a route candidate nearest to the position of the user's own vehicle, at a point in time that the right or left turning intention is detected by the right or left turning intention detecting unit 52. In accordance with this feature, in the case that the right or left turning intention is detected, the route can be changed immediately.

In the present embodiment (Operative Example 2), there may further be provided the route change information storage unit 32 in which a history of route change information is stored, and the automated driving control unit 44 may change the route to a route candidate having high priority on the basis of the route change information stored in the route change information storage unit 32. In this manner, if a change in the route is made for which there is a high possibility of being selected by the vehicle occupant from the route change information history, then in the case that the right or left turning intention is detected, the route can be changed immediately.

The present embodiment (Operative Example 2) is equipped with the notification unit (display device 68) for providing notification of the route candidates. In the case there are a plurality of route candidates at a point in time that the right or left turning intention is detected by the right or left turning intention detecting unit 52, the notification unit provides notification of the plurality of route candidates, and the automated driving control unit 44 changes the route to a route candidate selected by the vehicle occupant from among the plurality of route candidates. In accordance with this feature, if there are a plurality of route candidates, a route to be changed to can be specified in accordance with the intentions of the vehicle occupant.

In the present embodiment (Operative Example 2), the notification unit is a display unit (display device 68). The display unit displays a route candidate that is nearest to the position of the user's own vehicle in a larger size than other route candidates. On the premise that there is a high possibility that the nearest route candidate will be selected, displaying the route candidates in this manner makes it easier for the occupant to select the route that should be changed to.

In the present embodiment (Operative Example 2), the notification unit is a display unit (display device 68), and is further equipped with the route change information storage unit 32 in which a history of the route change information is stored. The display unit displays a route candidate having high priority at a larger size than other route candidates, on the basis of the route change information stored in the route change information storage unit 32. In this manner, assuming there is displayed in a preferential manner a route from among past route change information for which the possibility of being selected by the vehicle occupant is high, the route to be changed to can easily be selected by the occupant.

In the present embodiment (Operative Example 2), the surrounding environmental information acquisition unit (surrounding environmental information detecting unit 14, surrounding environment recognition unit 42) recognizes the road shoulder structure 96, 98, and the automated driving control unit 44 determines whether or not a right or left turn is possible on the basis of the road shoulder structure 96, 98 recognized by the surrounding environmental information acquisition unit, and changes the route only in the event that the right or left turn is possible. In this manner, the route can be changed if there is not a road shoulder structure 96, 98 such as a curb. Further, if there is such a road shoulder structure 96, 98, and assuming that the route is not changed, it is possible to prevent the occurrence of an impact due to the user's own vehicle riding over the road shoulder structure 96, 98 or the like.

In the present invention (Operative Example 2), the surrounding environmental information acquisition unit (surrounding environmental information detecting unit 14, surrounding environment recognition unit 42) recognizes the vehicle lane 100L, and the automated driving control unit 44 determines whether or not it is necessary when changing the route to straddle the vehicle lane 100L that was recognized by the surrounding environmental information acquisition unit, and changes the route only if it is unnecessary to straddle the vehicle lane 100L. In this manner, if a change in the route is carried out without making a lane change, then since there is no need to perform controls involving a high processing load such as making a lane change or the like, the burden on the computational processing device can be reduced.

The present invention is not limited to the embodiment described above, and it goes without saying that various arrangements may be adopted therein without deviating from the essential gist of the present invention.

The invention claimed is:

1. A driving assistance device comprising:
a surrounding environmental information acquisition unit that recognizes surrounding environmental information of a user's own vehicle; and
an automated driving control unit that controls automated driving in which the user's own vehicle is driven automatically along a previously set route without depending on operations of a vehicle occupant, on basis of the surrounding environmental information of the user's own vehicle, which was recognized by the surrounding environmental information acquisition unit;
the driving assistance device further comprising:
a right or left turning intention detecting unit that detects a right or left turning intention of the vehicle occupant who changes to another route from the previously set route;
a route change information storage unit in which a history of route change information that indicates route change performed during the automated driving of the user's own vehicle is stored;
wherein, in the case that the right or left turning intention of the vehicle occupant is detected by the right or left turning intention detecting unit, the automated driving control unit changes the route to a right turn direction or a left turn direction as indicated by the right or left turning intention, and then continues with the automated driving,
the automated driving control unit changes the route to a route candidate having high priority, on basis of the route change information stored in the route change information storage unit.

2. A driving assistance device comprising:
a surrounding environmental information acquisition unit that recognizes surrounding environmental information of a user's own vehicle; and
an automated driving control unit that controls automated driving in which the user's own vehicle is driven automatically along a previously set route without depending on operations of a vehicle occupant, on basis of the surrounding environmental information of the user's own vehicle, which was recognized by the surrounding environmental information acquisition unit;
the driving assistance device further comprising:
a right or left turning intention detecting unit that detects a right or left turning intention of the vehicle occupant who changes to another route from the previously set route;
a notification unit that provides notification of a route candidate,
wherein, in the case that the right or left turning intention of the vehicle occupant is detected by the right or left turning intention detecting unit, the automated driving control unit changes the route to a right turn direction or a left turn direction as indicated by the right or left turning intention, and then continues with the automated driving, wherein, at a point in time that the right or left turning intention is detected by the right or left turning intention detecting unit, if there are a plurality of route candidates, the notification unit provides notification of the plurality of route candidates; and the automated driving control unit changes the route to a route candidate selected by the vehicle occupant from among the plurality of route candidates.

3. The driving assistance device according to claim 2, wherein:
the notification unit is a display unit; and
the display unit displays a route candidate that is nearest to the position of the user's own vehicle, in a larger size than other route candidates.

4. The driving assistance device according to claim 2, wherein the notification unit is a display unit, and further comprising:
a route change information storage unit in which a history of the route change information is stored;
wherein the display unit displays a route candidate having high priority in a larger size than other route candidates, on basis of the route change information stored in the route change information storage unit.

5. A driving assistance device comprising:
a surrounding environmental information acquisition unit that recognizes surrounding environmental information of a user's own vehicle; and
an automated driving control unit that controls automated driving in which the user's own vehicle is driven automatically along a previously set route without depending on operations of a vehicle occupant, on basis of the surrounding environmental information of the user's own vehicle, which was recognized by the surrounding environmental information acquisition unit;
the driving assistance device further comprising:
a right or left turning intention detecting unit that detects a right or left turning intention of the occupant who changes to another route from the previously set route;
wherein, in the case that the right or left turning intention of the occupant is detected by the right or left turning intention detecting unit, the automated driving control unit changes the route to a right turn direction or a left turn direction as indicated by the right or left turning intention, and then continues with the automated driving,
the surrounding environmental information acquisition unit recognizes a road shoulder structure; and
the automated driving control unit determines whether or not a right or left turn is possible on basis of the road shoulder structure recognized by the surrounding environmental information acquisition unit, and changes the route only in an event that the right or left turn is possible.

6. A driving assistance device comprising:
a surrounding environmental information acquisition unit that recognizes surrounding environmental information of a user's own vehicle; and
an automated driving control unit that controls automated driving in which the user's own vehicle is driven automatically along a previously set route without depending on operations of a vehicle occupant, on basis of the surrounding environmental information of the user's own vehicle, which was recognized by the surrounding environmental information acquisition unit;
the driving assistance device further comprising:
a right or left turning intention detecting unit that detects a right or left turning intention of the occupant who changes to another route from the previously set route;
wherein, in the case that the right or left turning intention of the occupant is detected by the right or left turning intention detecting unit, the automated driving control unit changes the route to a right turn direction or a left turn direction as indicated by the right or left turning intention, and then continues with the automated driving,
the surrounding environmental information acquisition unit recognizes a vehicle lane; and
the automated driving control unit determines whether or not it is necessary when changing the route to straddle the vehicle lane that was recognized by the surrounding environmental information acquisition unit, and changes the route only if it is unnecessary to straddle the vehicle lane.

* * * * *